(12) United States Patent
Doelle

(10) Patent No.: US 10,581,059 B2
(45) Date of Patent: Mar. 3, 2020

(54) METHOD OF MANUFACTURING ELECTRODE FOR RECHARGEABLE BATTERY INCLUDING PROCESS OF DRYING ELECTRODE SLURRY BY APPLYING VACUUM IN CERTAIN DIRECTION

(71) Applicant: LG Chem, Ltd., Seoul (KR)

(72) Inventor: Janis Doelle, Daejeon (KR)

( * ) Notice: Subject to any disclaimer, the term of this patent is extended or adjusted under 35 U.S.C. 154(b) by 0 days.

(21) Appl. No.: 15/744,563

(22) PCT Filed: Sep. 12, 2016

(86) PCT No.: PCT/KR2016/010289
§ 371 (c)(1),
(2) Date: Jan. 12, 2018

(87) PCT Pub. No.: WO2017/061714
PCT Pub. Date: Apr. 13, 2017

(65) Prior Publication Data
US 2018/0205066 A1     Jul. 19, 2018

(30) Foreign Application Priority Data

Oct. 8, 2015    (KR) .................. 10-2015-0141355

(51) Int. Cl.
*H01M 4/04*       (2006.01)
*H01M 10/052*     (2010.01)
(Continued)

(52) U.S. Cl.
CPC ........... *H01M 4/0404* (2013.01); *H01M 2/10* (2013.01); *H01M 4/04* (2013.01); *H01M 4/1391* (2013.01);
(Continued)

(58) Field of Classification Search
CPC .... H01M 4/04; H01M 4/0404; H01M 4/0471; H01M 4/1391; H01M 2/10; H01M 10/04; H01M 10/052; H01M 10/0525
(Continued)

(56) References Cited

U.S. PATENT DOCUMENTS 5,775,002 A * 7/1998 Iwase ............... F26B 13/104
                                                      29/2
6,692,873 B1   2/2004 Park et al.
(Continued)

FOREIGN PATENT DOCUMENTS

JP    H07220722 A    8/1995
JP    2001076733 A   3/2001
(Continued)

OTHER PUBLICATIONS

Extended European Search Report for Application No. 16853830.4 dated Mar. 21, 2018, 6 pages.
(Continued)

*Primary Examiner* — Brian K Talbot
(74) *Attorney, Agent, or Firm* — Lerner, David, Littenberg, Krumholz & Mentlik, LLP

(57) ABSTRACT

The present invention relates to a method of manufacturing an electrode for a rechargeable battery, including (a) coating electrode slurry including an electrode active material, a binder, and a solvent on one surface of a sheet-shaped current collector; and (b) drying the electrode slurry while applying vacuum in a direction of decreasing agglomeration of the binder due to vaporization of the solvent.

15 Claims, 5 Drawing Sheets

(51) Int. Cl.
*H01M 2/10* (2006.01)
*H01M 10/04* (2006.01)
*H01M 4/1391* (2010.01)
*H01M 10/0525* (2010.01)

(52) U.S. Cl.
CPC ......... *H01M 10/04* (2013.01); *H01M 10/052* (2013.01); *H01M 10/0525* (2013.01)

(58) Field of Classification Search
USPC ..................................... 427/58, 115; 34/361
See application file for complete search history.

(56) References Cited

U.S. PATENT DOCUMENTS

| | | | |
|---|---|---|---|
| 2004/0048151 A1 | 3/2004 | Hayashi et al. | |
| 2009/0117263 A1* | 5/2009 | Kaido | H01M 4/8828 427/115 |
| 2012/0285036 A1* | 11/2012 | Matsuyama | H01M 4/139 34/406 |
| 2013/0196235 A1 | 8/2013 | Prieto et al. | |
| 2014/0238299 A1 | 8/2014 | Cho | |
| 2014/0329126 A1 | 11/2014 | Ho et al. | |
| 2015/0086875 A1 | 3/2015 | Yoshida | |
| 2015/0255780 A1* | 9/2015 | Tsuchiya | F26B 13/10 427/58 |
| 2015/0280208 A1 | 10/2015 | Kimura et al. | |
| 2016/0206979 A1 | 7/2016 | Spelter et al. | |

FOREIGN PATENT DOCUMENTS

| | | |
|---|---|---|
| JP | 2010033918 A | 2/2010 |
| JP | 2012251763 A | 12/2012 |
| JP | 2015173034 A | 10/2015 |
| KR | 100500915 B1 | 7/2005 |
| KR | 100659863 B1 | 12/2006 |
| KR | 20120109373 A | 10/2012 |
| KR | 20130076758 A | 7/2013 |
| KR | 20130130292 A | 12/2013 |
| KR | 20140054840 A | 5/2014 |
| KR | 20140082958 A | 7/2014 |
| KR | 20140108005 A | 9/2014 |
| KR | 20140125381 A | 10/2014 |
| KR | 20150057990 A | 5/2015 |

OTHER PUBLICATIONS

International Search Report for Application No. PCT/KR2016/010289 dated Dec. 20, 2016.

Lim et al., Latex migration in battery slurries during drying, Langmuir, Jul. 2013, vol. 29, No. 26, pp. 8233-8244.

* cited by examiner

METHOD OF MANUFACTURING ELECTRODE FOR RECHARGEABLE BATTERY INCLUDING PROCESS OF DRYING ELECTRODE SLURRY BY APPLYING VACUUM IN CERTAIN DIRECTION

CROSS-REFERENCE TO RELATED APPLICATIONS

This application is a national phase entry under 35 U.S.C. § 371 of International Application No. PCT/KR2016/010289, filed Sep. 12, 2016, which claims priority to Korean Patent Application No. 10-2015-0141355, filed Oct. 8, 2015, the disclosures of which are incorporated herein by reference.

TECHNICAL FIELD

The present invention relates to a method of manufacturing an electrode for a rechargeable battery including a process of drying electrode slurry by applying vacuum in a certain direction.

BACKGROUND

Due to rapid increase of fossil fuel use, demand for use of alternative energy or clean energy is increasing, the field to be most actively studied as part of it is power generation and electricity storage using electrochemistry.

At present, a representative example of an electrochemical device using this electrochemical energy may include a rechargeable battery, and the usage area thereof is gradually expanding.

The rechargeable battery is classified into a cylindrical battery and an angular battery in which an electrode assembly is embedded in a cylindrical or angular metal can, and a pouch-shaped battery in which an electrode assembly is embedded in a pouch-shaped case of an aluminum laminate sheet, depending on the shape of a battery case.

The electrode assembly embedded in the battery case is a repeatedly chargeable and dischargeable power generation device composed of a stacked structure of positive electrode/separator/negative electrode, and classified into a jelly-roll type in which a separator is interposed between a negative electrode and a positive electrode in a long sheet shape having an active material coated thereon and wound, and a stack type in which a plurality of positive and negative electrodes having a predetermined size are sequentially stacked with a separator interposed therebetween.

As an electrode assembly having a more advanced structure of a mixed form of the jelly-roll type and the stack type, a stack/folding type electrode assembly in which a full cell having a positive electrode/separator/negative electrode structure or a bicell having a positive electrode (negative electrode)/separator/negative electrode (positive electrode)/separator/positive electrode (negative electrode) structure, having a constant unit size is folded using a long continuous separation film, has been developed.

In addition, in order to improve processability of the conventional stack type electrode assembly, and meet the demand of various types of rechargeable battery, a lamination/stack type electrode assembly having a structure formed by stacking unit cells in which electrodes and separators are stacked alternately and laminated has been also developed.

Meanwhile, an electrode which is a core constituent element of this rechargeable battery is manufactured by applying electrode slurry including an electrode active material, a binder, a solvent and the like on a current collector composed of metals, and performing drying.

During a drying process of the electrode slurry, binder particles are agglomerated around the surface of an electrode slurry layer. It is known that this phenomenon occurs, since vaporization of the solvent occurs on the surface of the electrode slurry layer during the drying process, and when the solvent in the inside moves to the vicinity of the surface by a capillary phenomenon, the binder which is solvated so that it is in a state of being flowable in the electrode slurry layer moves together to the vicinity of the surface of the electrode slurry layer.

When binder particles are agglomerated at the vicinity of the surface of the electrode slurry layer, as a whole of the electrode, dispersibility of the electrode active material and the like is deteriorated, and adhesion efficiency of the binder is lowered, Eventually, binder particle agglomeration causes problems such as increased internal resistance of the electrode, deteriorated electrolyte solution impregnability, and overall performance degradation of the rechargeable battery.

Accordingly, there is a high need for technology to decrease binder agglomeration during the drying process of electrode slurry, thereby capable of improving dispersibility of an electrode active material, and increasing adhesion efficiency of a binder.

Technical Problem

The present invention has been made in an effort to provide a method of manufacturing an electrode for a rechargeable battery including a process of drying electrode slurry by applying vacuum in a certain direction having advantages of solving the problems of the relevant art as described above, and overcoming the technical challenges which have been requested from the past.

The inventors of the present application repeated in-depth research and various experiments, and as a result, as described below, have found out that in the case that when manufacturing an electrode for a rechargeable battery, a process of drying electrode slurry while applying vacuum in a direction of decreasing binder agglomeration due to vaporization of a solvent is included, binder agglomeration is decreased, thereby improving dispersibility of an electrode active material, and increasing adhesion efficiency of the binder, and completed the present invention.

Technical Solution

Therefore, an exemplary embodiment of the present invention provides a method of manufacturing an electrode for a rechargeable battery includes:

(a) coating electrode slurry including an electrode active material, a binder, and a solvent on one surface of a sheet-shaped current collector; and (b) drying the electrode slurry while applying vacuum in a direction of decreasing agglomeration of the binder due to vaporization of the solvent.

In a general drying process of electrode slurry, as the solvent is vaporized on the surface of an electrode slurry layer, the solvent moves to the surface of the electrode slurry layer by a capillary phenomenon. Here, a binder which is solvated so that it is flowable moves to the surface together with the solvent, thereby causing agglomeration.

According to the present invention, the movement of the flowable binder to the surface of the electrode slurry layer may be reduced, by applying vacuum in a direction of decreasing the movement of the binder to the surface direction of the electrode slurry layer. That is, the direction of decreasing agglomeration refers to a direction of decreasing the binder moving to a surface direction of an electrode slurry layer, and being agglomerated with each other.

As a specific example, in an XYZ stereotactic coordinate system, the current collector is located on an XY plane at Z=0, the electrode slurry is coated on one surface of the current collector, on the XY plane under the condition of Z>0, and vacuum may be applied in one or more directions selected from optional directions satisfying Z<0 and optional directions on the XY plane at Z=0.

When the electrode slurry is coated on one surface of the current collector to form a constant thickness, on the XY plane under the condition of Z>0, the surface of the electrode slurry layer refers to the XY plane having the largest Z value among them.

Since the solvent is vaporized mainly on the surface of the electrode slurry layer, binder particles move toward the surface.

Therefore, when vacuum is applied in one or more directions selected from optional directions satisfying Z<0 and optional directions on the XY plane at Z=0, it is decreased that the binder moves to the surface of the electrode slurry layer and is agglomerated with each other.

Specifically, since vacuum may be applied in an optional direction satisfying Z<0, and the optional direction of Z<0 refers to the direction opposite to the surface of the electrode slurry layer, the movement of the binder may be effectively decreased.

Assuming that the surface of the electrode slurry layer is an upper surface, the direction on the XY plane at Z=0 may be a side direction of the electrode slurry layer. As such, when vacuum is applied in the side direction, the force to move the binder to the surface may be dispersed.

In addition, vacuum may be applied in both a first direction and a second direction on the XY plane at Z=0 simultaneously, and the first direction may be an opposite direction to the second direction. That is, when vacuum is applied in the side direction of the electrode slurry layer, it may be applied in opposite directions simultaneously, in order to prevent the binder from moving with being biased to one side of both sides of the electrode slurry layer.

As a specific example, the solvent used in the preparation of the electrode slurry may include, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, formic acid methyl, acetic acidmethyl, phosphoric acid triester, trimethoxy methane, a dioxolane derivative, sulfolane, methyl sulfolane, 1,3-dimethyl-2-imidazolidinone, propylene carbonate derivative, a tetrahydrofuran derivative, ether, methyl pyropionate, and ethyl propionate.

As a specific example, the vacuum may be a pressure of 0.8 atm or less, specifically, a pressure of 0.01 atm or more and 0.4 atm or less.

When the vacuum is applied with a pressure more than 0.8 atm, the force on the binder particles is so small that it is difficult to decrease the agglomeration of the binder particles, and when the vacuum is applied with a pressure less than 0.01 atm, the force on the electrode slurry layer is so strong that the entire electrode slurry layer tilts to one side, or the surface is uneven, thereby increasing an appearance inferiority rate.

As a specific example, the vacuum is maintained at constant pressure, or the pressure may be changed.

Specifically, the vacuum pressure may be changed, and more specifically, the vacuum pressure may be changed with periodic variability. In the case that the vacuum pressure is changed, the movement of the binder may be effectively controlled, as compared with the case of maintaining constant pressure.

In addition, in the case that the pressure is changed with periodic variability, the movement of the binder may be more effectively controlled with less energy, and thus, the agglomeration of the binder on the surface may be further decreased.

As a specific example, the process (b) may be carried out in a drying oven to apply heat. In the case that heat is applied together with vacuum, the slurry may be more rapidly dried, and the time during which the binder can be agglomerated is reduced, thereby decreasing an agglomerated amount also.

Meanwhile, in the process (b), the electrode slurry coated on the current collector is dried by a continuous process, thereby improving productivity.

Specifically, in the process (b), the continuous process may be carried out, with the other surface of the current collector on which the electrode slurry is coated being in contact with transfer equipment.

Here, the transfer equipment is not particularly limited, as long as it may continuously transfer the current collector having the electrode slurry coated thereon, but may be for example, a conveyor belt.

The conveyor belt may have an at least partially penetrated structure so that the vacuum may be applied to the current collector. The penetrated structure refers to a structure in which fluid may move to upper and lower surfaces through the conveyor belt. Through this penetrated structure, even in the case of applying vacuum to the lower surface of the conveyor belt, sufficient vacuum may be applied to the current collector.

Specifically, the penetrated structure may be a structure in which through-holes are formed in the conveyor belt. Otherwise, the conveyor belt may be composed of a material having pores through which fluid is movable.

Meanwhile, the current collector may have a thickness of 4 μm to 20 μm, specifically, 4 μm to 10 μm.

When the thickness is less than 4 μm, the current collector is so thin that the shape may be deformed upon application of vacuum, and when the thickness is more than 20 μm, the current collector is so thick that in the case of applying vacuum to the lower surface of the current collector, it may be difficult to apply the force by vacuum to the electrode slurry layer coated on the upper surface of the current collector.

As a specific example, the electrode slurry may further include a conductive material for improving the conductivity of the electrode.

Another embodiment of the present invention provides an electrode for a rechargeable battery manufactured by the above method.

Yet another embodiment of the present invention provides an electrode assembly including the electrode, and a rechargeable battery in which the electrode assembly is embedded in a battery case together with an electrolyte solution.

Hereinafter, other components of the rechargeable battery will be described.

Positive and negative electrodes are collectively called the electrode. The positive electrode may be manufactured by, for example, coating positive electrode slurry in which a positive electrode active material and a binder are mixed on a positive electrode current collector, and drying it, and if required, a conductive material and a filler may be further added to the positive electrode slurry.

The positive electrode current collector is not particularly limited as long as it does not cause a chemical change in the battery and has high conductivity, and for example, one selected from the group consisting of stainless steel, aluminum, nickel, titanium, and aluminum or stainless steel of which the surface is treated with carbon, nickel, titanium or silver may be used, and specifically, aluminum may be used. The current collector may have fine protrusions and depressions formed on the surface, thereby increasing adhesiveness of the positive electrode active material, and have various shapes such as a film, a sheet, foil, nets, a porous body, foam and a non-woven fabric body.

The positive electrode active material may include, for example, a layered compound such as lithium cobalt oxide ($LiCoO_2$) and lithium nickel oxide ($LiNiO_2$) or the compound substituted with one or more transition metals; lithium manganese oxide such as a compound of the chemical formula, $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxide such as $LiV_3O_8$, $LiV_3O_4$, $V_2O_5$ and $Cu_2V_2O_7$; Ni-site type lithium nickel oxide represented by the chemical formula, $LiNi_{1-x}M_xO_2$ (wherein M=Co, Mn, Al, Cu, Fe, Mg, B or Ga, and x=0.01-0.3); lithium manganese composite oxide represented by the chemical formula, $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li of the chemical formula is partially substituted with an alkaline-earth metal ion; a disulfide compound; $Fe_2(MoO_4)_3$ and the like, but not limited thereto.

The conductive material is added generally at 1 to 30 wt %, based on the total weight of a positive electrode mixture including the positive electrode active material. This conductive material is not particularly limited, as long as it does not cause a chemical change in the battery and has conductivity, and for example, carbon blacks such as graphite, carbon black, acetylene black, ketjen black, channel black, furnace black, lamp black and summer black; conductive fiber such as carbon fiber or metal fiber; carbon fluoride, metal powder such as aluminum and nickel powder; conductive whisky such as zinc oxide and potassium titanate; conductive metal oxide such as titanium oxide; a conductive material such as a polyphenylene derivative, and the like may be used.

The binder included in the positive electrode is a component assisting in binding the active material and the conductive material and the like, and binding for the current collector, and generally added at 1 to 30% by weight, based on the total weight of the mixture including the positive electrode active material. The example of this binder may include polyfluorovinylidene, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers and the like.

The filler is a component suppressing the expansion of the positive electrode, and optionally used, and is not particularly limited as long as it does not cause chemical changes in the battery and is a fibrous material, and for example, olefin-based polymers such as polyethylene and polypropylene; fibrous materials such as glass fiber and carbon fiber, may be used.

However, the negative electrode may be manufactured by coating negative electrode slurry including a negative electrode active material and a binder on the negative electrode current collector, and a dispersing agent, a filler and the like may be optionally further included.

The negative electrode current collector is not particularly limited as long as it does not cause a chemical change in the battery and has conductivity, and for example, copper, stainless steel, aluminum, nickel, titanium, sintered carbon, copper or stainless steel of which the surface is treated with carbon, nickel, titanium, silver and the like, an aluminum-cadmium alloy and the like may be used. Further, like the positive electrode current collector, the binding force of the negative electrode active material may be strengthened by forming fine protrusions and depressions on the surface thereof, and the negative electrode current collector may be used in various shapes such as a film, a sheet, a foil, nets, a porous body, foam and a non-woven fabric body.

The negative electrode active material may include, for example, natural graphite, artificial graphite, metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; a conductive polymer such as polyacetylene; Li—Co—Ni-based material, and the like.

As a specific example, the separator may be a polyolefin-based film commonly used in the art, and for example, a sheet composed of one or more selected from the group consisting of high density polyethylene, low density polyethylene, linear low density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and a mixture thereof.

The separator may be composed of identical materials to each other, but not limited thereto, and of course, may be composed of different materials from each other, depending on the safety, energy density and overall performance of the battery cell.

The pore size and porosity of the separator are not particularly limited, but the porosity may be in a range of 10 to 95%, and the pore size (diameter) may be 0.1 to 50 μm. In the case that the pore size and the porosity are less than 0.1 μm and 10%, respectively, the separator serves as a resistance layer, and in the case that the pore size and the porosity are more than 50 μm and 95%, it is difficult to maintain mechanical properties.

The electrolyte solution may be a lithium salt-containing non-aqueous electrolyte, the lithium salt-containing non-aqueous electrolyte is composed of a non-aqueous electrolyte and a lithium salt, and the non-aqueous electrolyte may include a non-aqueous organic solvent, an organic solid electrolyte, an inorganic solid electrolyte and the like, but not limited thereto.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, acetic acidmethyl, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate and the like.

The organic solid electrolyte may include, for example, a polyethylene derivative, a polyethylene oxide derivative, a polypropylene oxide derivative, a phosphoric acid ester polymer, poly agitation lysine, polyester sulfide, polyvinyl alcohol, polyvinylidene fluoride, a polymer including an ionic dissociation group, and the like.

The inorganic solid electrolyte may include, for example, nitride, halide and sulfate of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, and the like.

The lithium salt is a material which is readily dissolved in the non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborane, lower aliphatic lithium carbonate, 4-phenyl lithium borate, imide and the like.

In addition, to the non-aqueous electrolyte, for improving charge and discharge characteristic, flame retardant and the like, for example, pyridine, triethyl phosphite, triethanolamine, cyclic ether, ethylene diamine, n-glyme, triamide hexaphosphate, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride and the like may be added.

In some cases, for imparting inflammability, a halogen-containing solvent such as carbon tetrachloride and ethylene trifluoride may be further included, and for improving high temperature storage characteristics, carbon dioxide gas may be further included, and FEC (fluoro-ethylene carbonate), PRS (propene sultone) and the like may be further included.

As a specific example, a lithium salt such as $LiPF_6$, $LiClO_4$, $LiBF_4$, and $LiN(SO_2CF_3)_2$ is added to a mixed solvent of cyclic carbonate such as EC or PC which is a high dielectric solvent and linear carbonate such as DEC, DMC or EMC which is a low viscosity solvent, thereby preparing the lithium salt-containing non-aqueous electrolyte.

Yet another embodiment of the present invention provides a battery pack including this rechargeable battery as a unit cell, and a device including this battery pack as a power supply.

The device may be, for example, a laptop computer, a netbook, a tablet PC, a mobile phone, MP3, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a system for electric power storage, but of course, not limited thereto.

Since the structure and manufacturing method of this device are known in the art, the details therefor will be omitted in the present specification.

DETAILED DESCRIPTION OF THE EMBODIMENTS

Hereinafter, the present invention will be described referring to drawings according to an exemplary embodiment of the present invention, but this is for easier understanding of the present invention, and the scope of the present invention is not limited thereto.

Figure 1:
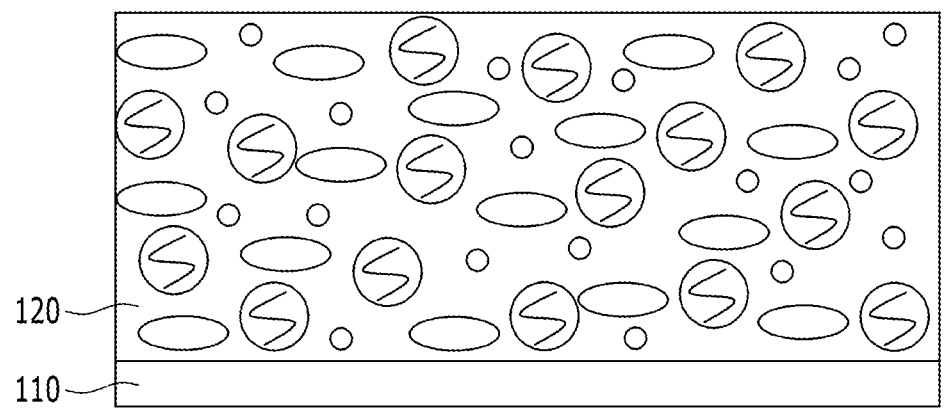
FIG. 1 is a schematic view of an electrode having electrode slurry coated on a current collector.

FIG. 1 illustrates a schematic view of an electrode having electrode slurry coated on a current collector.

Referring to FIG. 1, electrode slurry 120 is coated on a current collector 110 of an electrode 100, the electrode slurry 120 includes an electrode active material, a binder, a conductive material and a solvent, and in particular the binder is in a state of being solvated, and flowable in the electrode slurry 120.

To Immediately after coating the electrode slurry 120 on the current collector 110, the electrode active material, binder and conductive material are dispersed overall uniformly in the electrode slurry 120.

Figure 2:
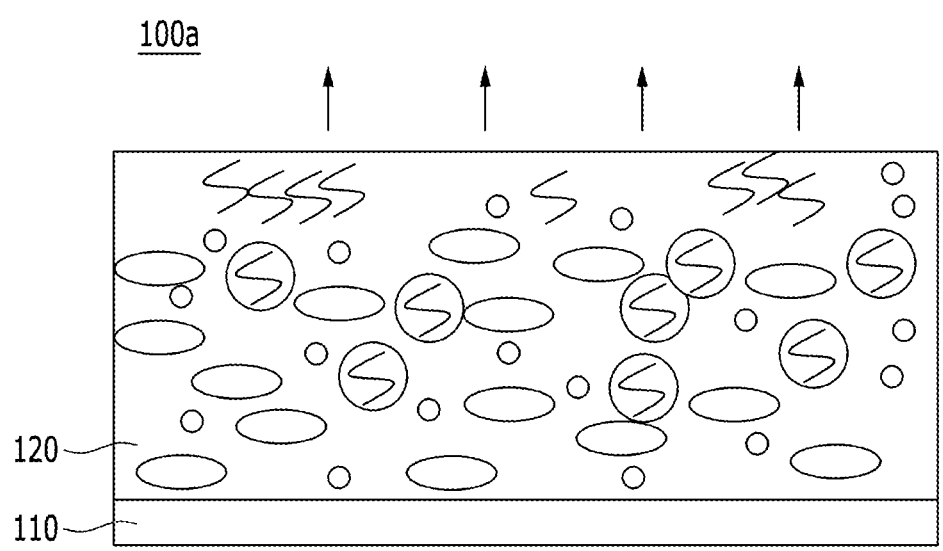
FIG. 2 is a schematic view representing the progress of drying of electrode slurry in the electrode of FIG. 1.

FIG. 2 illustrates a schematic view representing the progress of drying of electrode slurry in the electrode of FIG. 1.

Referring to FIG. 2, the electrode slurry 120 is coated on the current collector 110 of the electrode 100a, and the electrode slurry 120 includes an electrode active material, a binder, a conductive material and a solvent. The binder is in a state of being partially solvated, and flowable in the electrode slurry 120, and is partially vaporized so that it is in a state of being impossible to flow.

Specifically, as the solvent is vaporized on the surface of the electrode slurry 120, the solvent moves to the surface of the electrode slurry 120 by a capillary phenomenon. Here, as a binder which is solvated and flowable moves to the surface together with the solvent, the binder is agglomerated.

On the surface of the electrode slurry 120, the binder after solvent vaporization remains in a state of being agglomerated, and the solvated binder in the electrode slurry 120 continuously moves to the surface by a capillary phenomenon, so that binder agglomeration on the surface further deepens.

Figure 3:
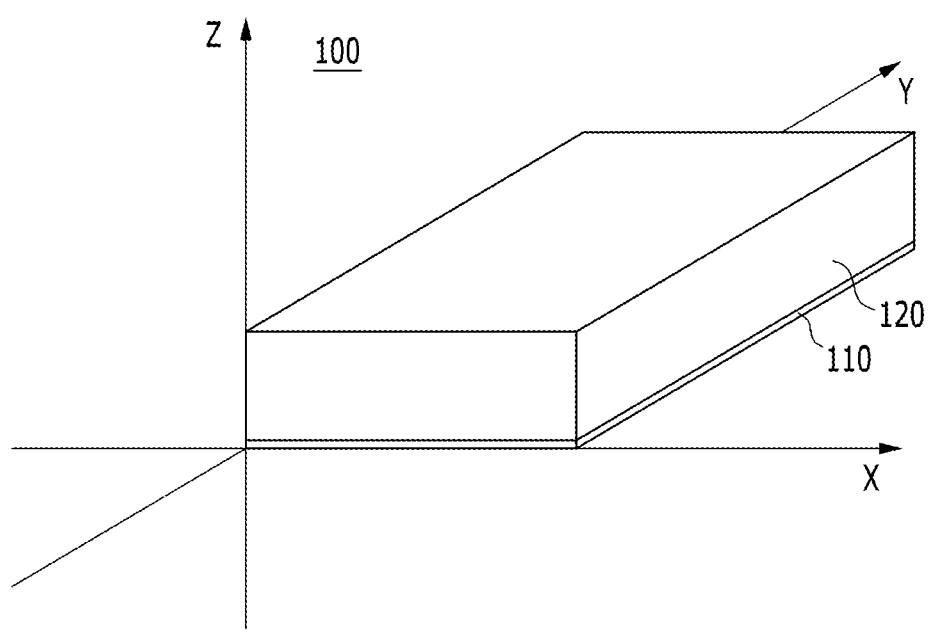
FIG. 3 is a schematic view representing the electrode of FIG. 1 as an XYZ stereotactic coordinate system.

FIG. 3 illustrates a schematic view representing the electrode of FIG. 1 as an XYZ stereotactic coordinate system.

Referring to FIG. 3 together with FIG. 1, the electrode slurry 120 is coated on the current collector 110 of the electrode 100, and the electrode slurry 120 includes an electrode active material, a binder, a conductive material and a solvent.

Specifically, in an XYZ stereotactic coordinate system, the current collector 110 is located on an XY plane at Z=0, and the electrode slurry 120 is coated on one surface of the current collector 110, on the XY plane under the condition of Z>0.

Figure 4:
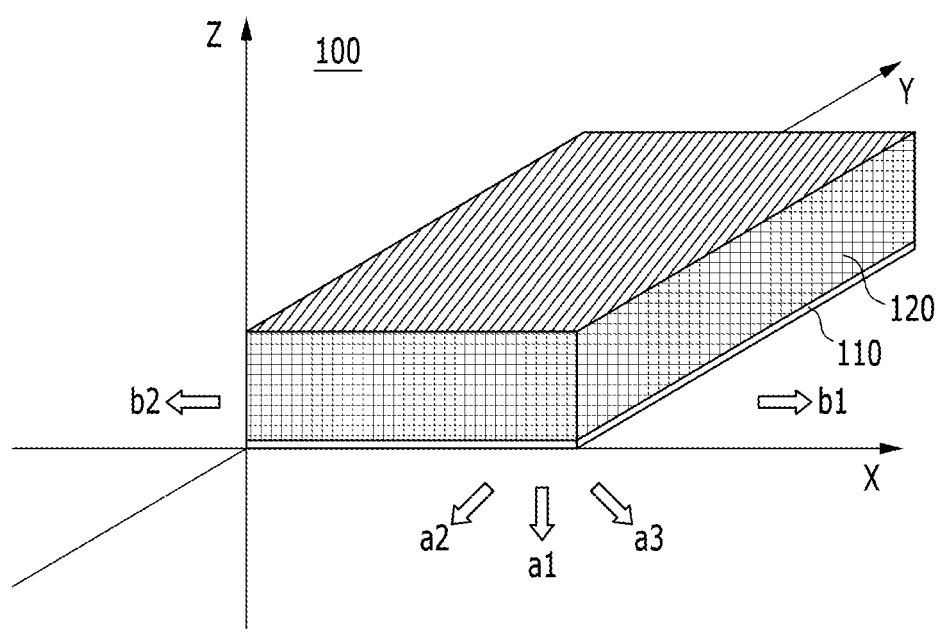
FIG. 4 is a schematic view illustrating a method of applying vacuum in a certain direction upon drying the electrode of FIG. 3 according to an exemplary embodiment of the present invention.

FIG. 4 illustrates a schematic view representing a method of applying vacuum in a certain direction upon drying the electrode of FIG. 3 according to an exemplary embodiment of the present invention.

Referring to FIG. 4, when the electrode slurry 120 is coated on one surface of the current collector 110 in a constant thickness formed, on the XY plane under the condition of Z>0, the surface of the electrode slurry 120 refers to the XY plane having the largest Z value (hatched) among them. Since the solvent is vaporized mainly on the surface of the electrode slurry 120, the binder particles moves toward the surface.

Therefore, when applying vacuum in one or more directions selected from optional directions satisfying Z<0 (a1, a2 and a3), and optional directions on the XY plane at Z=0 (b1 and b2), the force to move the binder to the surface of the electrode slurry 120 may be offset or dispersed.

Specifically, the vacuum may be applied in optional directions satisfying Z<0 (a1, a2 and a3), and the optional directions at Z<0 (a1, a2 and a3) refer to opposite directions to the surface of the electrode slurry 120 (hatched), and thus, the movement of the binder may be effectively decreased.

Assuming that the surface of the electrode slurry 120 (hatched) is an upper surface, the directions on the XY plane at Z=0 (b1 and b2) may be a side (plaid) direction of the electrode slurry 120. As such, when the vacuum is applied in the side directions b1 and b2, the force to move the binder to the surface (hatched) of the electrode slurry 120 may be dispersed.

The vacuum may be applied in a first direction b1 and a second direction b2 simultaneously on the XY plane at Z=0, and the first direction b1 is opposite to the second direction b2. That is, when the vacuum is applied in the side direction of the electrode slurry 120, the vacuum may be applied at opposite directions simultaneously in order to prevent the binder from moving with being biased to one side of both sides of the electrode slurry layer 120.

Figure 5:
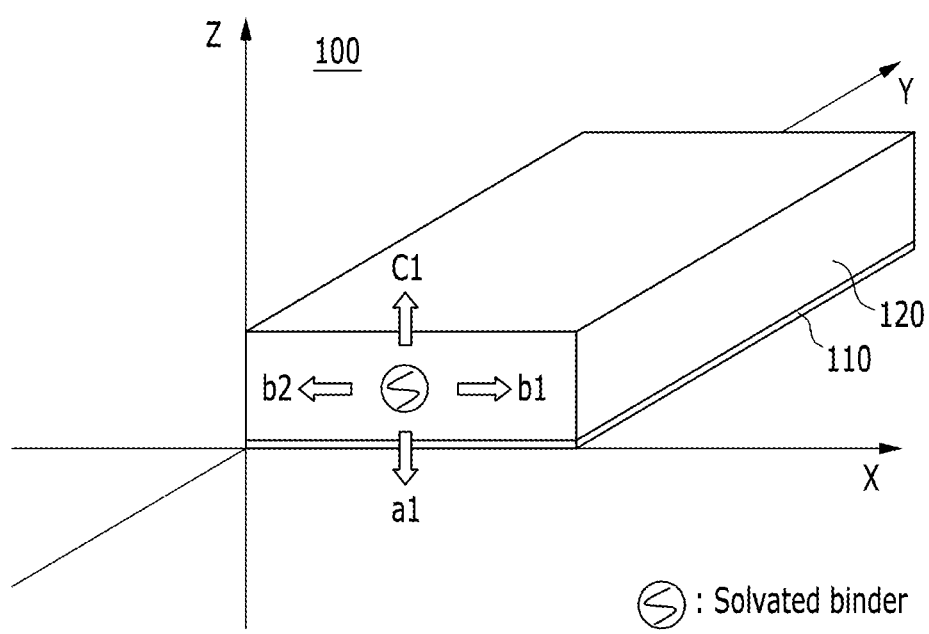
FIG. 5 is a schematic view representing force on a solvated binder upon drying the electrode of FIG. 3 according to an exemplary embodiment of the present invention.

FIG. 5 illustrates a schematic view representing the force on the solvated binder upon drying the electrode of FIG. 3 according to an exemplary embodiment of the present invention.

Referring to FIG. 5, the solvated binder is included in the electrode slurry 120, and for convenience of description, only one binder is illustrated, however, the force acts similarly on the binders positioned in the electrode slurry 120.

The solvent is vaporized in the surface direction c1 wherein the surface is the upper surface of the electrode slurry 120, and on the solvated binder particles, the force to move them in the surface direction c1 acts by a capillary phenomenon.

Here, when the vacuum is applied in the lower surface direction a1 satisfying Z<0 of the electrode slurry 120, suction by the vacuum acts in an opposite direction to the force acting in the surface direction c1, and thus, the force to move the binder to the surface direction c1 is offset.

Further, the vacuum is applied in opposite directions, the first direction b1 and the second direction b2 on the XY plane at Z=0 simultaneously, thereby dispersing the force to move the solvated binder to the surface c1 of the electrode slurry 120, and at the same time, preventing the solvated binder from moving with being biased to one side of both sides of the electrode slurry 120.

As described above, the present invention has been described referring to the drawings according to an exemplary embodiment of the present invention, however, it is possible for a person with ordinary skill in the art to which the present invention pertains to perform various applications and modification within the scope of the present invention, based on the description above.

INDUSTRIAL APPLICABILITY

As described above, the method of manufacturing an electrode for a rechargeable battery according to the present invention includes a process of drying electrode slurry while applying vacuum in a direction of decreasing agglomeration of the binder due to vaporization of the solvent, thereby decreasing binder agglomeration, improving dispersibility of an electrode active material, and increasing adhesion efficiency of the binder.

Further, binder agglomeration is decreased, thereby preventing internal resistance increase of an electrode, and improving electrolyte solution impregnability, and thus, the overall performance of a rechargeable battery may be improved.

The invention claimed is:

1. A method of manufacturing an electrode for a rechargeable battery, comprising:
   (a) coating electrode slurry including an electrode active material, a binder, and a solvent on one surface of a sheet current collector; and
   (b) drying the electrode slurry while applying vacuum in a direction to decrease agglomeration of the binder due to vaporization of the solvent,
   wherein the sheet current collector is located on an XY plane at Z=0,
   the electrode slurry is coated on one surface of the sheet current collector, on the XY plane under a condition of Z>0, and
   the vacuum is applied in one or more directions of optional directions satisfying Z<0 opposite directions to the surface of the electrode slurry or optional directions on the XY plane at Z=0 are side directions to the surface of the electrode slurry.

2. The method of claim 1, wherein the vacuum is applied in the optional direction satisfying Z<0.

3. The method of claim 1, wherein the vacuum is applied in a first direction and a second direction on the XY pane at Z=0 simultaneously, and the first direction is opposite to the second direction.

4. The method of claim 1, wherein the vacuum is a pressure of 0.8 atm or less.

5. The method of claim 1, wherein the vacuum is a pressure of 0.01 atm or more and 0.4 atm or less.

6. The method of claim 1, wherein the vacuum is maintained at constant pressure, or the pressure is changed.

7. The method of claim 1, wherein the vacuum pressure is changed with periodic variability.

8. The method of claim 1, wherein the process (b) is carried out in a drying oven to apply heat.

9. The method of claim 1, wherein in the process (b), the electrode slurry coated on the sheet current collector is dried by a continuous process.

10. The method of claim 9, wherein in the process (b), the continuous process is carried out with the other surface of the sheet current collector on which the electrode slurry is coated being in contact with transfer equipment.

11. The method of claim 10, wherein the transfer equipment is a conveyor belt.

12. The method of claim 11, wherein the conveyor belt is at least partially composed of a penetrated structure so that the vacuum is applied to the sheet current collector.

13. The method of claim 1, wherein the sheet current collector has a thickness of 4 μm to 20 μm.

14. The method of claim 1, wherein the sheet current collector has a thickness of 4 μm to 10 μm.

15. The method of claim 1, wherein the electrode slurry further includes a conductive material.

\* \* \* \* \*